(12) United States Patent
Tsai (10) Patent No.: US 8,882,263 B2
(45) Date of Patent: Nov. 11, 2014

(54) EYEGLASSES WITH MOVABLE TEMPLE END PIECES

(71) Applicant: Yih Tah Optics Co., Ltd., Tainan (TW)

(72) Inventor: Ming-Hsiang Tsai, Tainan (TW)

(73) Assignee: Yih Tah Optics Co., Ltd, Tainan (TW)

( * ) Notice: Subject to any disclaimer, the term of this patent is extended or adjusted under 35 U.S.C. 154(b) by 125 days.

(21) Appl. No.: 13/791,497

(22) Filed: Mar. 8, 2013

(65) Prior Publication Data

US 2014/0078463 A1    Mar. 20, 2014

(30) Foreign Application Priority Data

Sep. 20, 2012    (TW) .............................. 101134501 A (51) Int. Cl.
*G02C 5/14*    (2006.01)

(52) U.S. Cl.
CPC ..................................... *G02C 5/143* (2013.01)
USPC ........................................................ 351/123

(58) Field of Classification Search
CPC ................................. G02C 5/14; G02C 5/143

USPC .................................................. 351/111, 123
See application file for complete search history.

(56) References Cited

U.S. PATENT DOCUMENTS 5,440,356 A * 8/1995 Fukuwa ......................... 351/123
5,631,718 A * 5/1997 Markovitz et al. ............ 351/119

FOREIGN PATENT DOCUMENTS

TW           M406747 U1    7/2011

* cited by examiner

*Primary Examiner* — Huy K Mai
(74) *Attorney, Agent, or Firm* — Holland & Hart LLP (57) ABSTRACT

A pair of eyeglasses includes a pair of temple units, each including a main temple segment, a temple end piece, and an engaging mechanism. The temple end piece is disposed at an inner lateral side of the main temple segment and has a connecting segment disposed between a fastenable segment and a guide segment and swingably connected to the main temple segment. The temple end pieces of the temple units are movable between an engaging position, where the fastenable segments are fastened to the main temple segments via the engaging mechanisms, and a disengaging position, where the fastenable segments are disengaged from the main temple segments.

14 Claims, 12 Drawing Sheets

EYEGLASSES WITH MOVABLE TEMPLE END PIECES

CROSS-REFERENCE TO RELATED APPLICATION

This application claims priority of Taiwanese Application No. 101134501, filed on Sep. 20, 2012.

BACKGROUND OF THE INVENTION

1. Field of the Invention

The present invention relates to a pair of eyeglasses, more particularly to a pair of eyeglasses with movable temple end pieces.

2. Description of the Related Art

A pair of conventional eyeglasses generally includes a lens unit and a pair of temple units mounted respectively to two opposite lateral sides of the lens unit. Each temple unit includes a connecting segment pivoted to the lens unit and a wearing segment distal from the lens unit.

In order to prevent undesired removal of the eyeglasses from a user's head when the user is wearing the eyeglasses, a distance between the pair of wearing segments should be short enough. However, such short distance makes it inconvenient for the user to wear the conventional eyeglasses using one hand. In particular, the user must hold one of the temple units and make the wearing segment of the other one of the temple units contact the user's face, and then, by virtue of the resilience of the temple unit in contact with the user's face, the distance between the pair of wearing segments may be increased, such that the user might be able to wear the eyeglasses using one hand. However, when contacting the user's face, the temple unit is likely to poke the user's eye by accident, thereby exposing the user to possible injury.

Figure 1:
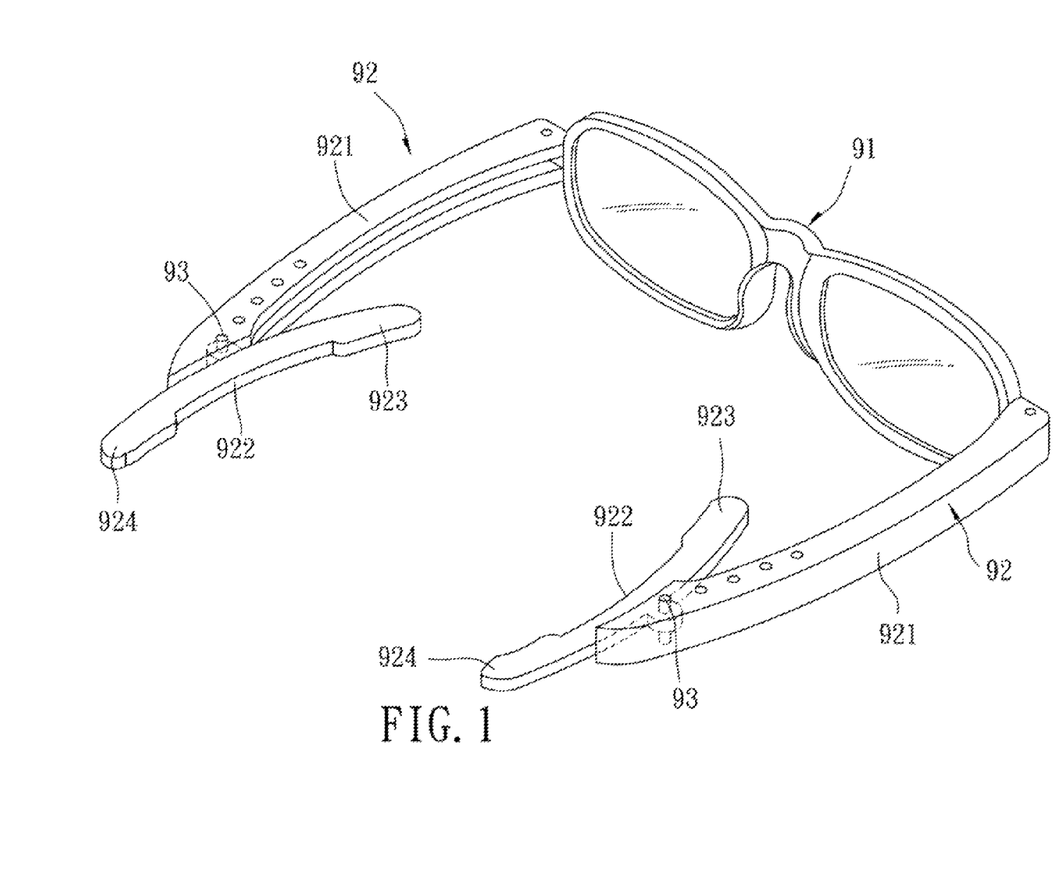
FIG. 1 is a perspective view of a conventional pair of eyeglasses disclosed in Taiwanese patent no. M406747.

Referring to FIG. 1, a pair of conventional eyeglasses disclosed in Taiwanese Patent no. M406747 may alleviate the above disadvantage. The pair of eyeglasses comprises a lens unit 91 and a pair of temple units 92 mounted respectively to two opposite lateral sides of the lens unit 91. Each temple unit 92 includes a main temple segment 921 having one end pivoted to the lens unit 91 and a temple end piece 922 mounted swingably to the other end of the main temple segment 921 via a pivot pin 93. Each temple end piece 922 has a first end 923 proximate to the lens unit 91 and a second end 924 distal from the lens unit 91.

With such configuration of the temple end pieces 922, it is easier and safer for the user to wear the eyeglasses using one hand because the distance between the second ends 924 of the pair of temple units 92 is not fixed. However, since the temple end pieces 922 are not fastenable onto the main temple segments 921, the temple end pieces 922 may cause damage to the lens unit 91 of the eyeglasses when the temple units 92 are folded.

SUMMARY OF THE INVENTION

Therefore, an object of the present invention is to provide a pair of eyeglasses with movable temple end pieces that may alleviate the above drawbacks of the prior art.

According to the present invention, a pair of eyeglasses comprises a lens unit and a pair of temple units. The lens unit includes a pair of temple mounting components respectively disposed on two opposite lateral sides of the lens unit. Each temple unit includes a main temple segment, a temple end piece, and an engaging mechanism. The main temple segment has one end connected to a respective one of the temple mounting components. The temple end piece is disposed at an inner lateral side of the main temple segment and has a fastenable segment, a guide segment distal from the fastenable segment, and a connecting segment disposed between the fastenable segment and the guide segment. The connecting segment is swingably connected to the main temple segment. The engaging mechanism is for removable engagement between the fastenable segment and the main temple segment.

The temple end pieces of the temple units are movable relative to the main temple segments of the temple units between an engaging position and a disengaging position. In the engaging position, the fastenable segments are fastened to the main temple segments via the engaging mechanisms of the temple units and the guide segments of the temple end pieces form a first distance therebetween. In the disengaging position, the fastenable segments are disengaged from the main temple segments and the guide segments of the temple end pieces form a second distance larger than the first distance therebetween.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 2:
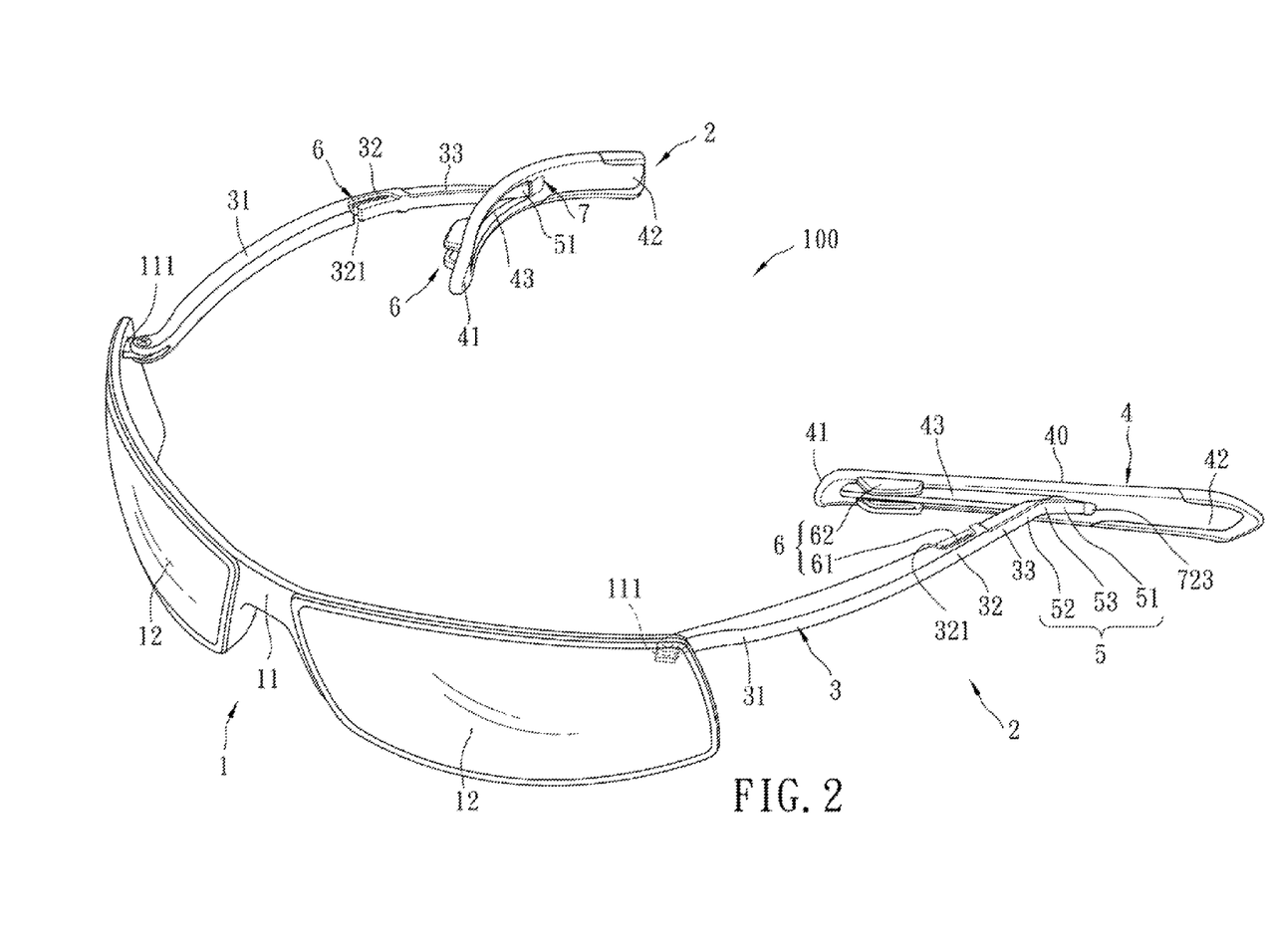
FIG. 2 is a perspective view of the first preferred embodiment of a pair of eyeglasses according to the present invention.
Figure 3:
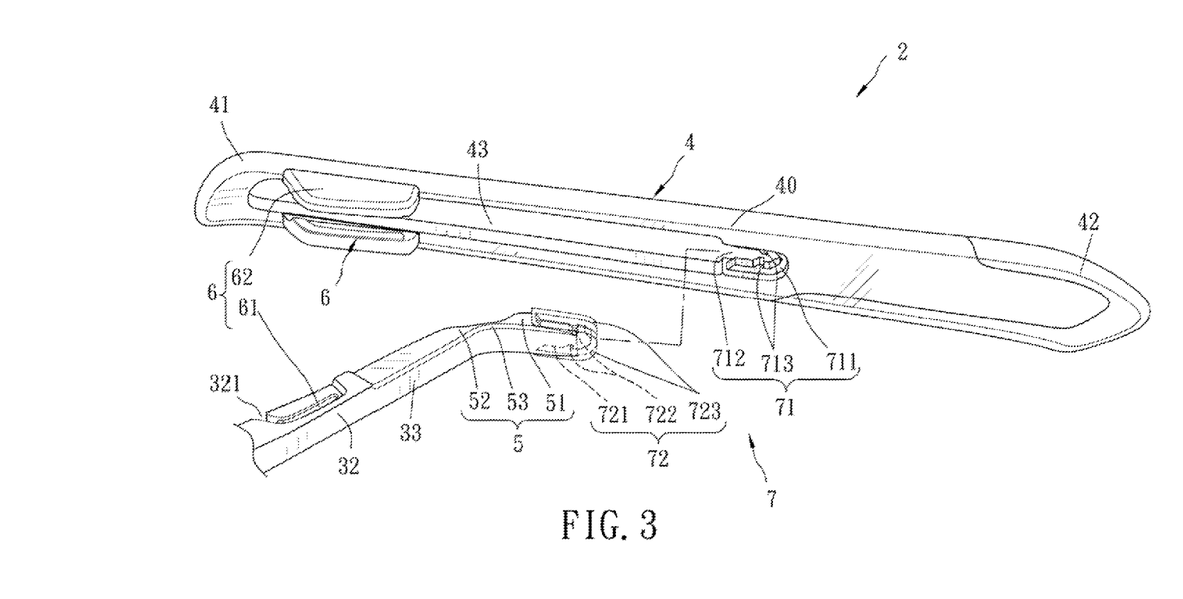
FIG. 3 is a fragmentary exploded perspective view illustrating a temple unit of the first preferred embodiment of the present invention.
Figure 4:
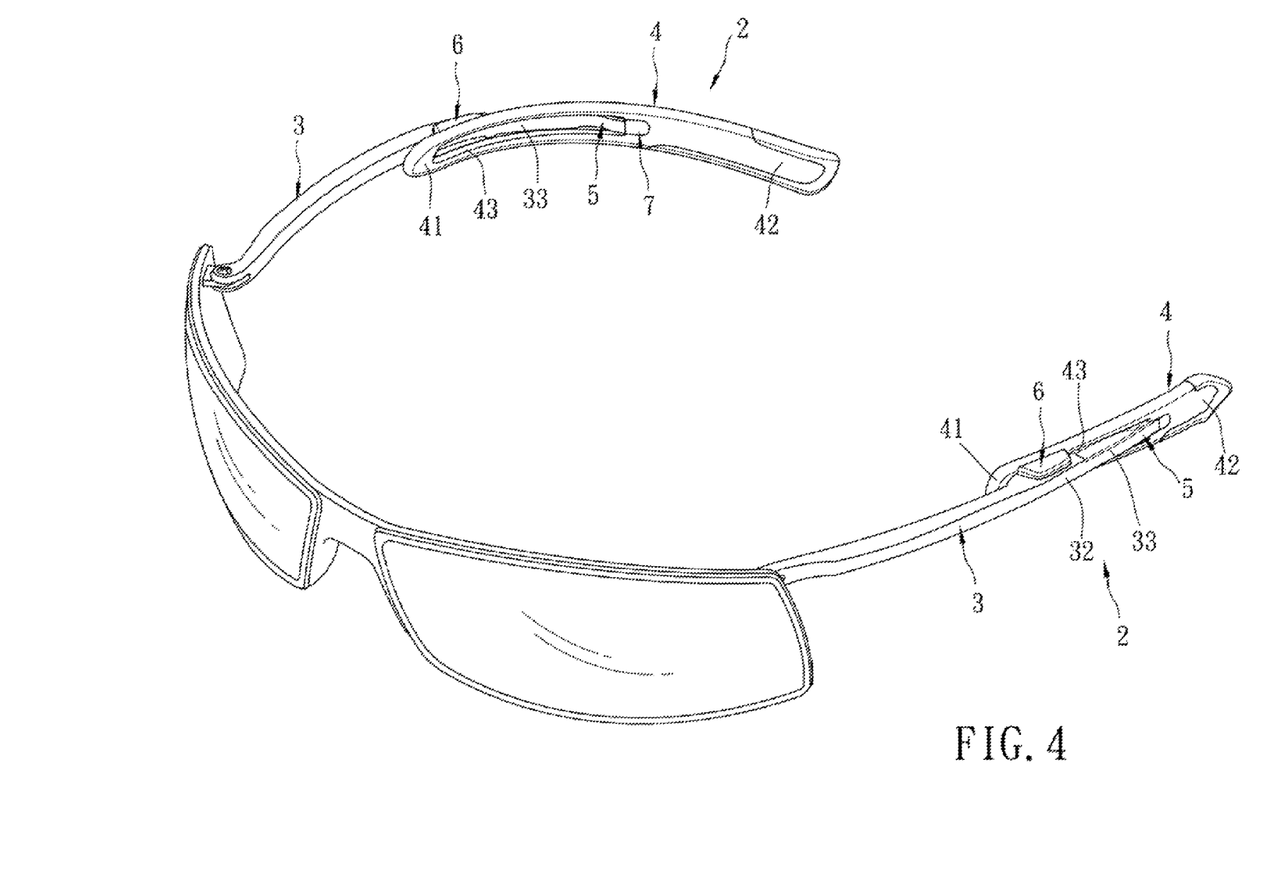
FIG. 4 is a view similar to FIG. 2 but illustrating temple end pieces of the temple units in an engaging position.

Referring to FIGS. 2, 3 and 4, the first preferred embodiment of a pair of eyeglasses 100 according to the present invention is shown to comprise a lens unit 1 and a pair of temple units 2 respectively disposed on two opposite lateral sides of the lens unit 1.

In this preferred embodiment, the lens unit 1 includes a lens frame 11 and a pair of lenses 12 mounted on the lens frame 11.

The lens frame 11 includes a pair of temple mounting components 111 respectively disposed on two opposite lateral sides of the lens unit 1. The lens unit 1 may be a full frame type, a half frame type or a frameless type and should not be limited to the disclosure in this embodiment.

In this preferred embodiment, the material of each of the temple units 2 is a resilient plastic material, such as nylon, polycarbonate, etc., but the invention should not be limited thereto. Each temple unit 2 is foldably mounted on the respective temple mounting component 111 and includes a main temple segment 3 having one end connected to the respective temple mounting component 111, a temple end piece 4 that is disposed at an inner lateral side of the main temple segment 3, a connecting portion 5 that swingably connects the temple end piece 4 to the main temple segment 3, a pair of engaging mechanisms 6 for removable engagement between the temple end piece 4 and the main temple segment 3, and a first joint mechanism 7 for interconnecting the temple end piece 4 and the connecting portion 5.

In this preferred embodiment, the main temple segment 3 of each temple unit 2 includes a pivoting section 31 pivoted to the respective temple mounting component 111, a fastening section 32 connected to the pivoting section 31, and an end section 33 that is connected between the fastening section 32 and the connecting portion 5.

In this preferred embodiment, the temple end piece 4 of each temple unit 2 has a fastenable segment 41 engaging removably the fastening section 32 of the main temple segment 3 via the engaging mechanisms 6, a guide segment 42 distal from the fastenable segment 41, and a connecting segment 40 disposed between the fastenable segment 41 and the guide segment 42 and swingably connected to the main temple segment 3. The fastenable segment 41 is formed with a slot 43 for accommodating the connecting portion 5 and the end section 33 of the main temple segment 3.

In this preferred embodiment, the temple end piece 4 of each temple unit 2 is swingably connected to the main temple segment 3 via the connecting portion 5 so as to be movable relative to the main temple segment 3 between a disengaging position (as shown in FIG. 2) and an engaging position (as shown in FIG. 4).

In this preferred embodiment, the connecting portion 5 of each temple unit 2 has a first end 51 connected to the temple end piece 4 via the first joint mechanism 7, a second end 52 opposite to the first end 51 and connected as one piece with the end section 33 of the main temple segment 3, and a bendable segment 53 disposed between the first and second ends 51, 52. The bendable segment 53 of each connecting portion 5 has a thickness that is gradually increased from a middle part thereof toward the first and second ends 51, 52. Accordingly, the bendable segment 53 is bendable and urges the temple end piece 4 toward the disengaging position.

Figure 5:
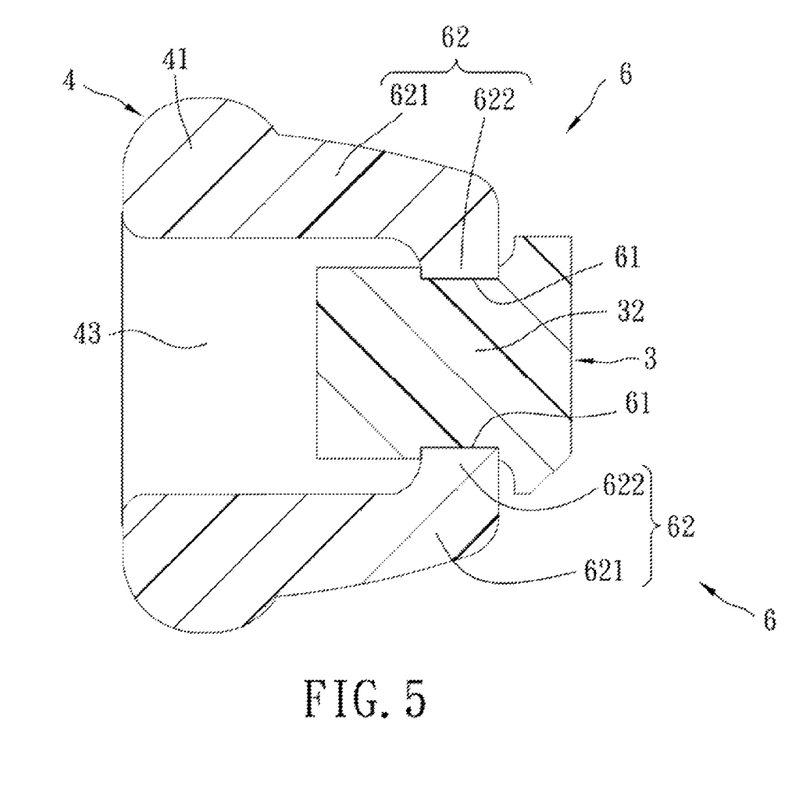
FIG. 5 is a sectional view of the temple unit when the temple end piece is in the engaging position.

Referring to FIGS. 2, 3 and 5, the two engaging mechanisms 6 of each temple unit 2 according to this preferred embodiment are disposed to be spaced apart vertically from each other. Each engaging mechanism 6 includes an engaging groove 61 disposed on the fastening section 32 of the main temple segment 3, and an engaging protrusion 62 disposed on the fastenable segment 41 of the temple end piece 4 for engaging removably the engaging groove 61. The engaging protrusion 62 includes a fixing wall 621 disposed on the fastenable segment 41 of the temple end piece 4 and an engaging wall 622 that extends from the fixing wall 621 to engage removably the engaging groove 61. The fastening section 32 is formed with a notch 321 at the inner lateral side of the fastenable section 32 of the main temple segment 3 and in spatial communication with the engaging grooves 61 of the engaging mechanisms 6.

While each temple unit 2 in this preferred embodiment includes a pair of engaging mechanisms 6, a different number of the engaging mechanism 6 (such as one) may be included in other embodiments of the present invention. Moreover, the positions of the engaging groove 61 and the engaging protrusion 62 may be interchanged in other embodiments of the present invention. The present invention is not limited to the disclosure of this preferred embodiment as long as the engaging mechanism 6 is able to removably fasten the fastenable segment 41 of the temple end piece 4 to the fastening section 32 of the main temple segment 3.

Figure 6:
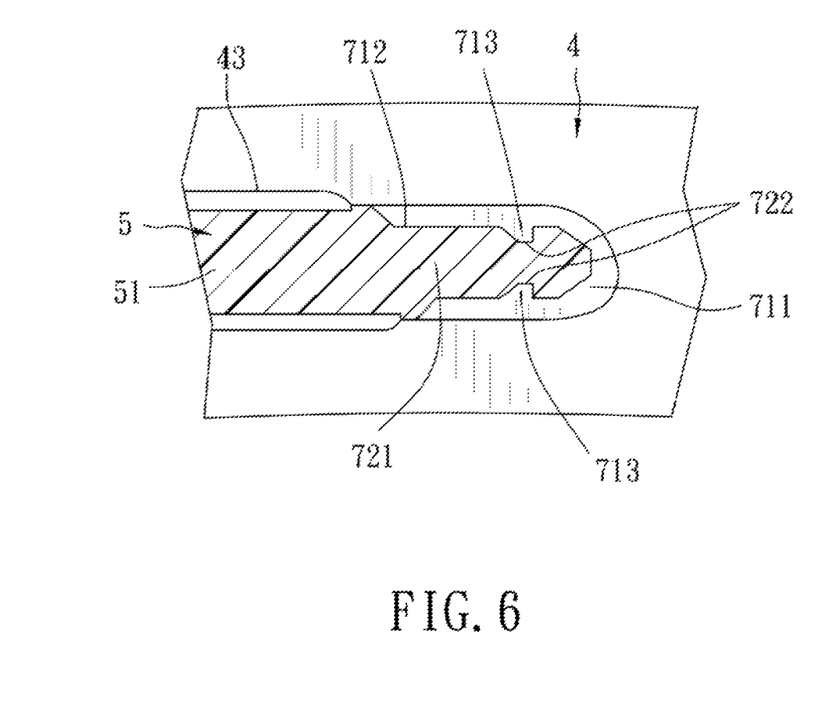
FIG. 6 is a fragmentary sectional view illustrating a first joint mechanism of the first preferred embodiment of the present invention.
Figure 7A:
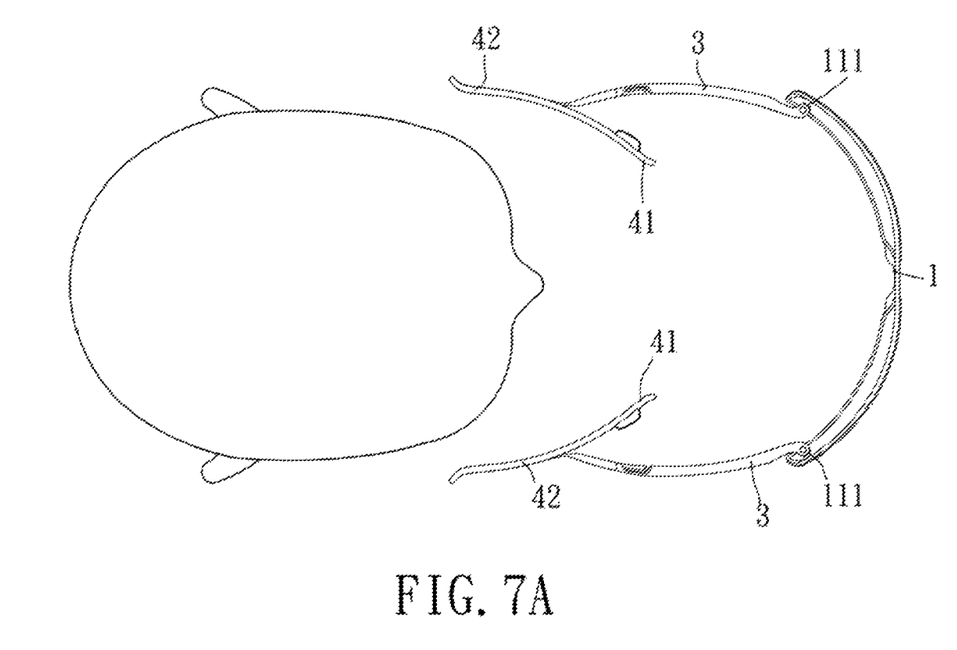
FIGS. 7A, 7B and 7C are schematic diagrams to illustrate consecutive steps of wearing the eyeglasses of the first preferred embodiment.
Figure 7B:
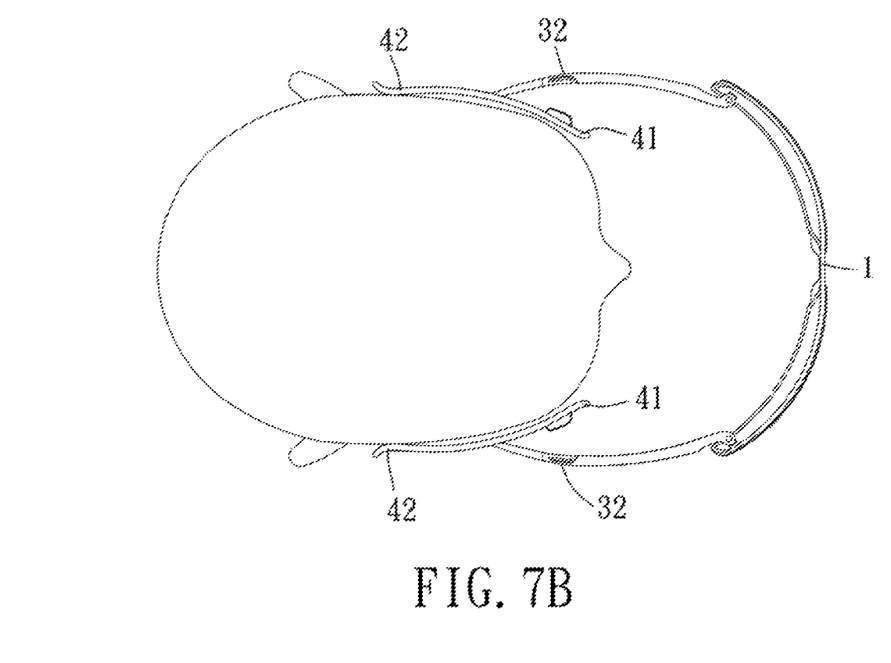
Figure 7C:
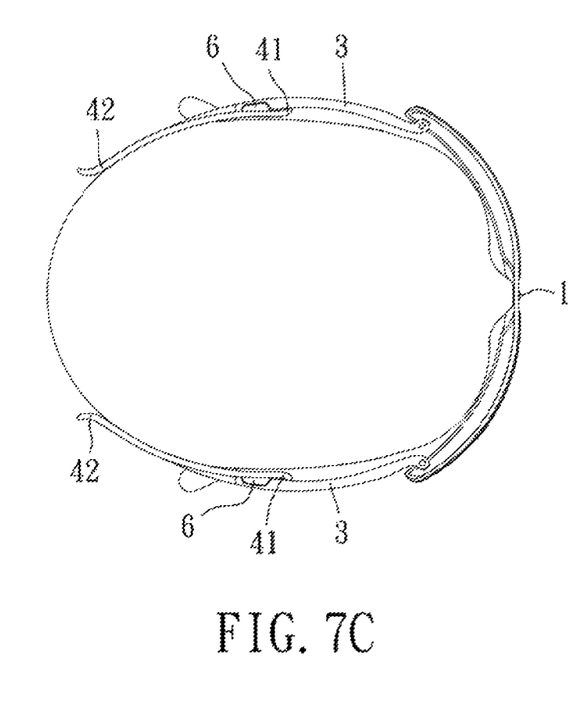

Referring to FIGS. 2, 3 and 6, the first joint mechanism 7 of each temple unit 2 according to this preferred embodiment includes a first socket 71 disposed on the connecting segment 40 of the temple end piece 4 and a first plug 72 disposed on the first end 51 of the connecting portion 5 for insertion into the first socket 71.

The first socket 71 of each temple unit 2 includes a first inner wall 711 formed with a first locking groove 712 that is in spatial communication with the slot 43, and a plurality of first protuberances 713 that extend into the first locking groove 712. The first plug 72 includes a first combining wall 721 for engaging the first locking groove 712 and formed with a plurality of combining grooves 722 for engaging the protuberances 713, and a pair of first side walls 723 that are disposed on opposite sides of the first combining wall 721 and that clamp the first inner wall 711 when the first plug 72 is inserted into the first socket 71.

It is noted that the positions of the first socket 71 and the first plug 72 may be interchanged in other embodiments of the present invention. The present invention is not limited to the disclosure of this preferred embodiment as long as the same result can be achieved.

Referring to FIGS. 2, 4, and 7A to 7C, before the eyeglasses of this preferred embodiment is worn, the temple end pieces 4 are in the disengaging position as shown in FIG. 2. In the disengaging position, the fastenable segments 41 are disengaged from the fastening sections 32 of the main temple segments 3, and the guide segments 42 of the temple end pieces 4 form a sufficiently large distance therebetween for enabling the user to easily and safely wear the eyeglasses using one hand.

When the user moves the eyeglasses toward his/her head, the fastenable segments 41 of the temple end pieces 4 contact against user's face and are forced to move toward the fastening section 32 of the respective main temple segment 3 until the temple end pieces 4 finally move to the engaging position as shown in FIG. 4. In the engaging position, the fastenable segments 41 are fastened to the fastening section 32 of the respective main temple segment 3 via the respective engaging mechanisms 6 and the guide segments 42 of the temple end pieces 4 form a comparatively smaller distance therebetween. At the same time, each slot 43 accommodates a part of the respective connecting portion 5 and the end section 33 of the respective main temple segment 3, thereby further decreasing the distance between the two guide segments 42 of the temple end pieces 4. As a result, the guide units 42 stably clamp the user's head, and the temple units 2 are able to fit the spaces between the user's ears and head. In actual implementation, each slot 43 may be configured to accommodate the entire connecting portion 5 and the end section 33 of the main temple unit 3.

To take off the eyeglasses, the user moves the eyeglasses away from his/her head. The guide segments 42 of the temple end pieces 4 that contact the user's head are forced to move away from each other. As a result, the fastenable segments 41 of the temple end pieces 4 are forced to the disengaging position as shown in FIG. 2. That is, the engaging protrusions 62 are forcibly disengaged from the engaging grooves 61.

It is understood that the notch 321 facilitates engagement and disengagement between the engaging grooves 61 and the engaging protrusions 62. As a result, each temple end piece 4 may move smoothly between the engaging position and the disengaging position. Furthermore, before folding the temple units 2, the user may move the fastenable segments 41 to engage the fastening sections 32 of the main temple segments 3, respectively, such that the temple end pieces 4 are fastened and are less likely to cause damage to the lens unit 1 when the temple units 2 are folded.

In this preferred embodiment, the connecting portion 5 of each temple unit 2 connects the main temple segment 3 to the connecting segment 40 of the temple end piece 4 and urges the temple end piece 4 toward the disengaging position. Consequently, the guide segments 42 of the temple end pieces 4 are urged to be distal from each other when the temple end pieces 4 are in the disengaging position, thereby enhancing safety and convenience when the user wears the eyeglasses using one hand. Moreover, each engaging mechanism 6 fastens the fastenable segment 41 of the respective temple end piece 4 to the fastening section 32 of the respective main temple segment 3, thereby improving stability of the eyeglasses and preventing the guide segments 42 from causing damage to the lens unit 1 when the temple units 2 are folded.

Figure 8:
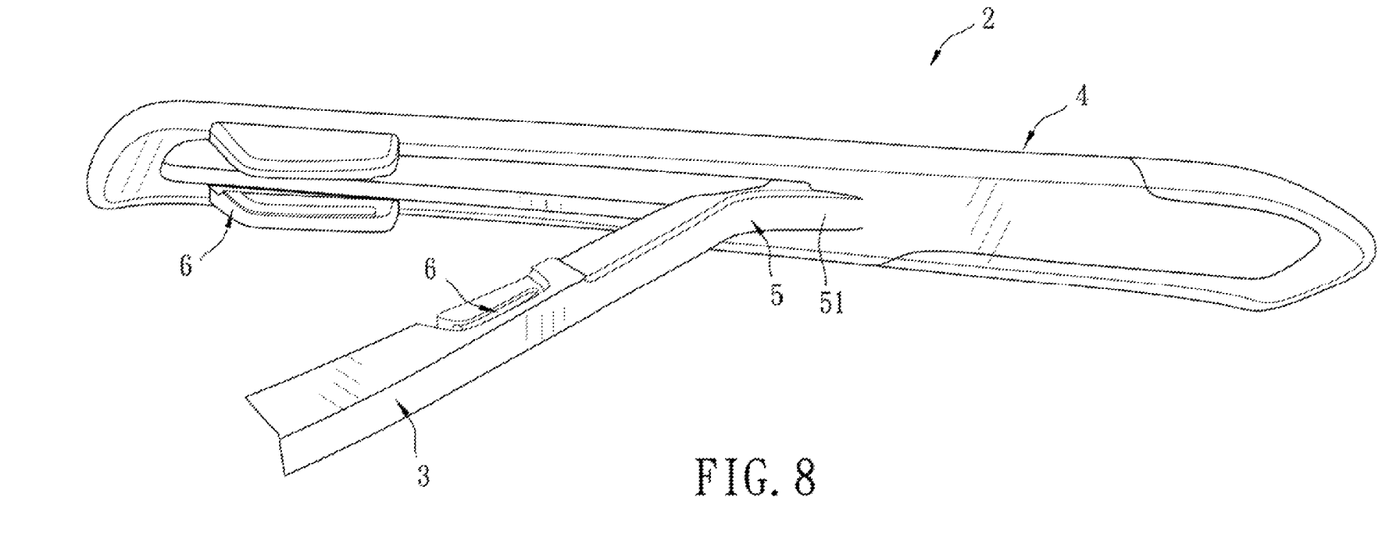
FIG. 8 is a fragmentary perspective view illustrating a temple unit of the second preferred embodiment of a pair of eyeglasses according to the present invention.

Referring to FIG. 8, a second preferred embodiment of the present invention is shown to be similar to the first preferred embodiment. The only difference resides in that the first end 51 of each connecting portion 5 is connected as one piece with the connecting segment 40 of the temple end piece 4. Therefore, the main temple segment 3, the temple end piece 4, the connecting portion 5 and the engaging mechanisms 6 of each temple unit 2 in this preferred embodiment are integrally formed as one piece. As a result, compared to the first preferred embodiment, an additional step of connecting the temple end pieces 4 and the connecting portions 5 may be omitted when the eyeglasses is manufactured, thereby improving production efficiency.

Figure 9:
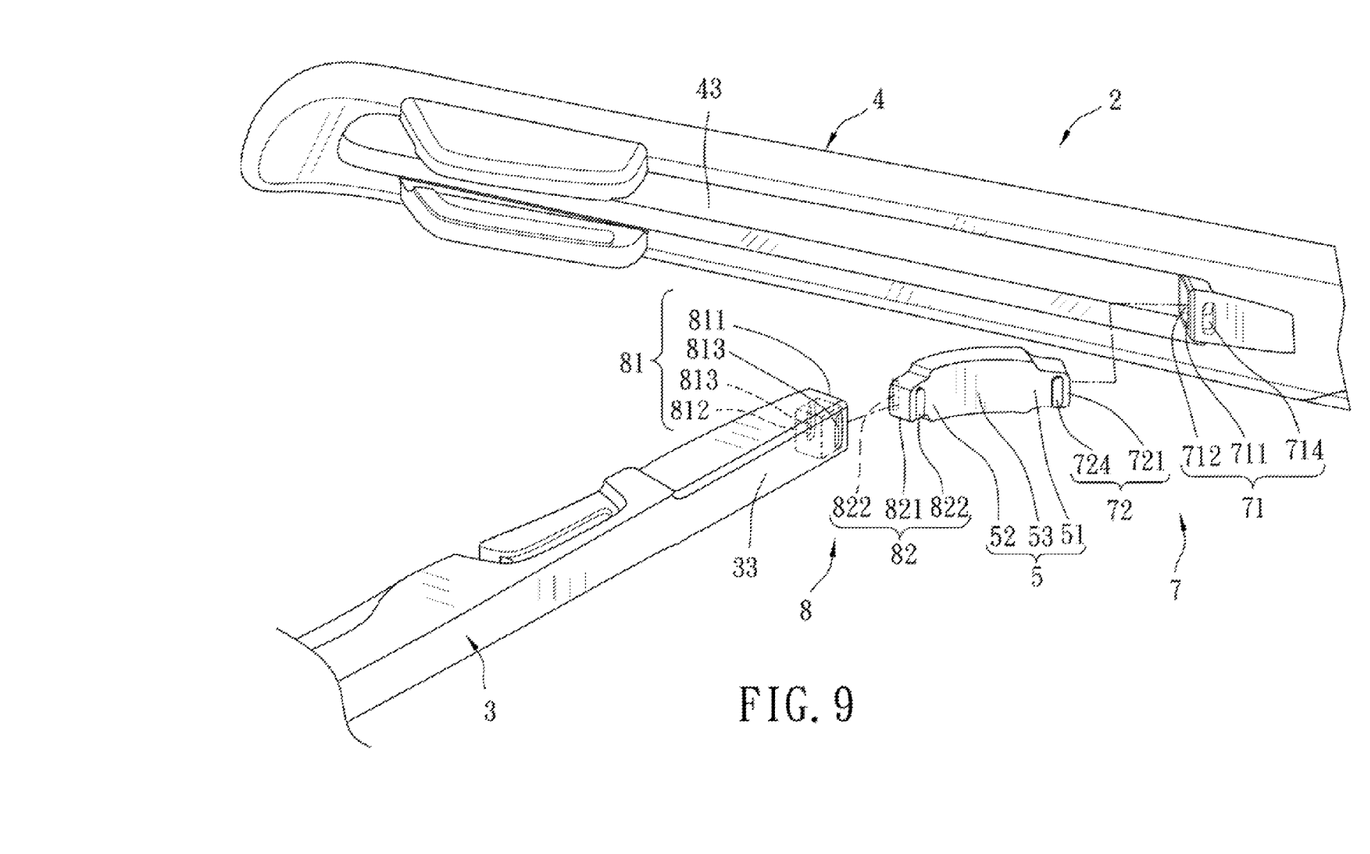
FIG. 9 is a fragmentary exploded perspective view illustrating a temple unit of the third preferred embodiment of a pair of eyeglasses according to the present invention.
Figure 10:
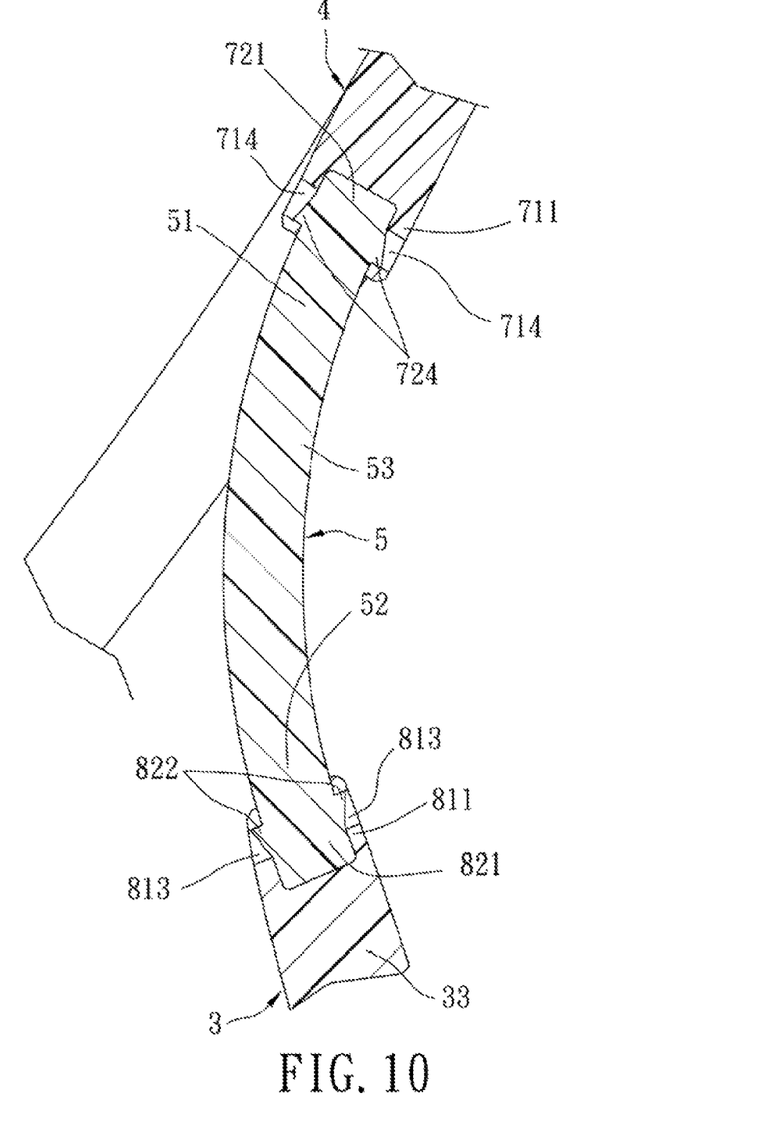
FIG. 10 is a fragmentary sectional view of the temple unit of the third preferred embodiment.

Referring to FIGS. 9 and 10, a third preferred embodiment of the present invention is shown to be similar to the first preferred embodiment. The differences reside in that the first socket 71 of the first joint mechanism 7 of each temple unit 2 includes a first inner wall 711 formed with a first locking groove 712 that is in spatial communication with the slot 43 of the temple end piece 4. The first inner wall 711 of the first socket 71 is further formed with a pair of first through holes 714 that are in spatial communication with the first locking groove 712. The first plug 72 includes a first combining wall 721 that is disposed on the first end 51 of the connecting portion 5 and that is for engaging the first locking groove 712. The first combining wall 721 of the first plug 72 is formed with a pair of first projections 724 to engage the pair of first through holes 714. Moreover, the main temple segment 3 of each temple unit 2 is not connected as one piece with the respective connecting portion 5. In this preferred embodiment, each temple unit 2 further includes a second joint mechanism 8 for interconnecting the end section 33 of the main temple segment 3 and the second end 52 of the connecting portion 5.

The second joint mechanism 8 of each temple unit 2 includes a second socket 81 disposed on the end section 33 of the main temple segment 3 and a second plug 82 disposed on the second end 52 of the connecting portion for insertion into the second socket 81. The second socket 81 includes a second inner wall 811 that defines a second locking groove 812 and that is formed with a pair of second through holes 813. The second plug 82 includes a second combining wall 821 inserted into the second locking groove 812 and formed with a pair of second projections 822 to engage the pair of second through holes 813. The positions of the second socket 81 and the second plug 82 may be interchanged in other embodiments of the present invention.

In this preferred embodiment, the configurations of the first and second joint mechanisms 7, 8 for interconnecting the main temple segments 3, the connecting portions 5 and the temple end pieces 4 enables the main temple segments 3, the temple end pieces 4 and the connecting portions 5 to be separably manufactured. As a result, the connecting portion 5 may be made by using a metal material, such as resilient steel, etc., thereby providing a stronger resilient restoring force. In addition, the bendable segment 53 with the reduced thickness is not needed in this preferred embodiment. Consequently, the structure of this preferred embodiment may be made stronger and the service life of the eyeglasses according to this preferred embodiment may be prolonged.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A pair of eyeglasses, comprising:
    a lens unit including a pair of temple mounting components respectively disposed on two opposite lateral sides of said lens unit; and
    a pair of temple units, each including
        a main temple segment having one end connected to a respective one of said temple mounting components,
        a temple end piece that is disposed at an inner lateral side of said main temple segment and that has a fastenable segment, a guide segment distal from said fastenable segment, and a connecting segment disposed between said fastenable segment and said guide segment and swingably connected to said main temple segment, and
        an engaging mechanism for removable engagement between said fastenable segment and said main temple segment;
    wherein said temple end pieces of said temple units are movable relative to said main temple segments of said temple units between an engaging position, where said fastenable segments are fastened to said main temple segments via said engaging mechanisms of said temple units and said guide segments of said temple end pieces form a first distance therebetween, and a disengaging position, where said fastenable segments are disengaged from said main temple segments and said guide segments of said temple end pieces form a second distance larger than the first distance therebetween.

2. The eyeglasses as claimed in claim 1, wherein each of said temple units further includes a connecting portion connecting another end of said main temple segment to said connecting segment of said temple end piece and urging said temple end piece toward the disengaging position.

3. The eyeglasses as claimed in claim 2, wherein said engaging mechanism includes an engaging groove disposed on one of said main temple segment and said fastenable segment of said temple end piece, and an engaging protrusion disposed on the other one of said main temple segment and said fastenable segment of said temple end piece for engaging removably said engaging groove.

4. The eyeglasses as claimed in claim 3, wherein each of said temple units includes a pair of said engaging mechanisms disposed to be spaced apart vertically from each other, said engaging protrusions of said engaging mechanisms being disposed on said fastenable segment of said temple end piece, said engaging grooves of said engaging mechanisms being disposed on said main temple segment.

5. The eyeglasses as claimed in claim 2, wherein said fastenable segment of said temple end piece is formed with a slot to accommodate said connecting portion when said temple end piece is in the engaging position.

6. The eyeglasses as claimed in claim 5, wherein each of said temple units includes a pair of said engaging mechanisms disposed to be spaced apart vertically from each other,
each of said engaging mechanisms including an engaging groove disposed on said main temple segment and an engaging protrusion disposed on said fastenable segment of said temple end piece for engaging removably said engaging groove,
said main temple segment of each of said temple units including a fastening section disposed with said engaging groove and an end section that is connected between said fastening section and said connecting portion and that is disposed in said slot of said temple end piece when said temple end piece is in the engaging position.

7. The eyeglasses as claimed in claim 6, wherein said engaging protrusion includes a fixing wall disposed on said fastenable segment of said temple end piece and an engaging wall that extends from said fixing wall to engage removably said engaging groove, said fastening section being formed with a notch at said inner lateral side of said main temple segment and in spatial communication with said engaging groove.

8. The eyeglasses as claimed in claim 2, wherein said connecting portion has a first end connected as one piece with said connecting segment of said temple end piece, a second end opposite to said first end and connected as one piece with said main temple segment, and a bendable segment disposed between said first and second ends, said bendable segment having a thickness that is gradually increased from a middle part thereof toward said first and second ends.

9. The eyeglasses as claimed in claim 2, wherein said connecting portion has a first end connected to said temple end piece and a second end that is opposite to said first end and that is connected to said main temple segment,
each of said temple units including a first joint mechanism for interconnecting said temple end piece and said first end of said connecting portion, said first joint mechanism including a first socket disposed on one of said connecting segment of said temple end piece and said first end of said connecting portion, and a first plug disposed on the other one of said connecting segment of said temple end piece and said first end of said connecting portion for insertion into said first socket.

10. The eyeglasses as claimed in claim 9, wherein said fastenable segment of said temple end piece is formed with a slot to accommodate said connecting portion when said temple end piece is in the engaging position,
said first socket being disposed on said connecting segment of said temple end piece and including a first inner wall formed with a first locking groove that is in spatial communication with said slot,
said first plug being disposed on said first end of said connecting portion and including a first combining wall for engaging said first locking groove.

11. The eyeglasses as claimed in claim 10, wherein said first inner wall is further formed with a protuberance that extends into said first locking groove, and said first combining wall is formed with a combining groove for engaging said protuberance.

12. The eyeglasses as claimed in claim 11, wherein said first plug further includes a pair of first side walls that are disposed on opposite sides of said first combining wall and that clamp said first inner wall when said first plug is inserted into said first socket, and said second end of said connecting portion is connected as one piece with said main temple segment.

13. The eyeglasses as claimed in claim 10, wherein each of said temple units further includes a second joint mechanism for interconnecting said main temple segment and said second end of said connecting portion, said second joint mechanism including a second socket disposed on one of said main temple segment and said second end of said connecting portion, and a second plug disposed on the other one of said main temple segment and said second end of said connecting portion for insertion into said second socket.

14. The eyeglasses as claimed in claim 13, wherein said first inner wall of said first socket is formed with a first through hole, and said first combining wall of said first plug is formed with a first projection to engage said first through hole,
said second socket is disposed on said main temple segment and includes a second inner wall that defines a second locking groove and that is formed with a second through hole, and
said second plug is disposed on said second end of said connecting portion and includes a second combining wall inserted into said second locking groove and formed with a second projection to engage said second through hole.

* * * * *